(12) United States Patent
Smidt et al.

(10) Patent No.: US 6,356,466 B1
(45) Date of Patent: Mar. 12, 2002

(54) MULTIMODE SWITCHED MODE POWER SUPPLY WITH OUTPUT STABILIZATION

(75) Inventors: Pieter Jan Mark Smidt, Eindhoven (NL); Thomas Dürbaum, Aachen (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/663,592

(22) Filed: Sep. 18, 2000

(30) Foreign Application Priority Data

Sep. 17, 1999 (EP) .............................. 99203051

(51) Int. Cl.⁷ .................... H02M 3/335; G05F 1/10; G05F 1/652
(52) U.S. Cl. ................. 363/21.17; 363/19; 363/21.01; 323/222; 323/282
(58) Field of Search ............... 363/19, 21.01, 363/21.12, 21.17; 323/222, 282, 284

(56) References Cited

U.S. PATENT DOCUMENTS

| | | | | |
|---|---|---|---|---|
| 4,447,741 A | * | 5/1984 | Moschopoulos | 307/31 |
| 4,649,464 A | * | 3/1987 | Shono | 363/21 |
| 4,884,183 A | | 11/1989 | Sable | 363/41 |
| 4,975,820 A | * | 12/1990 | Szepesi | 363/21 |
| 5,101,335 A | * | 3/1992 | Ludden et al. | 363/21 |
| 5,412,556 A | | 5/1995 | Marinus | 363/21 |
| 5,777,462 A | * | 7/1998 | Yue | 323/285 |
| 5,793,626 A | * | 8/1998 | Jjiang | 323/126 |
| 5,862,045 A | * | 1/1999 | Halamik et al. | 363/21 |
| 6,137,696 A | * | 10/2000 | Hall et al. | 363/21 |

FOREIGN PATENT DOCUMENTS

NL      9201428      12/1992      ......... H02M/3/156

* cited by examiner

*Primary Examiner*—Bao Q Vu

(57) ABSTRACT

A multimode switched-mode power supply operates in a first control mode when the output power supplied is lower than a predetermined value, and in a second control mode when the output power supplied is higher than said predetermined value. The switched-mode power supply comprises a series arrangement of a switch (S1) and an inductor (L; Lp), the series arrangement being coupled to receive a DC input voltage (Vin). A control circuit (CC) controls the on and/or off times of the switch (S1) to generate a periodical inductor current (Ip) in the inductor (L; Lp). In the first control mode, a peak value of the inductor current (Ip) is substantially constant, independent of the power supplied. The substantially constant peak value is substantially equal to a peak value of the inductor current (Ip) at an instant when the second control mode is altered into the first control mode.

6 Claims, 6 Drawing Sheets

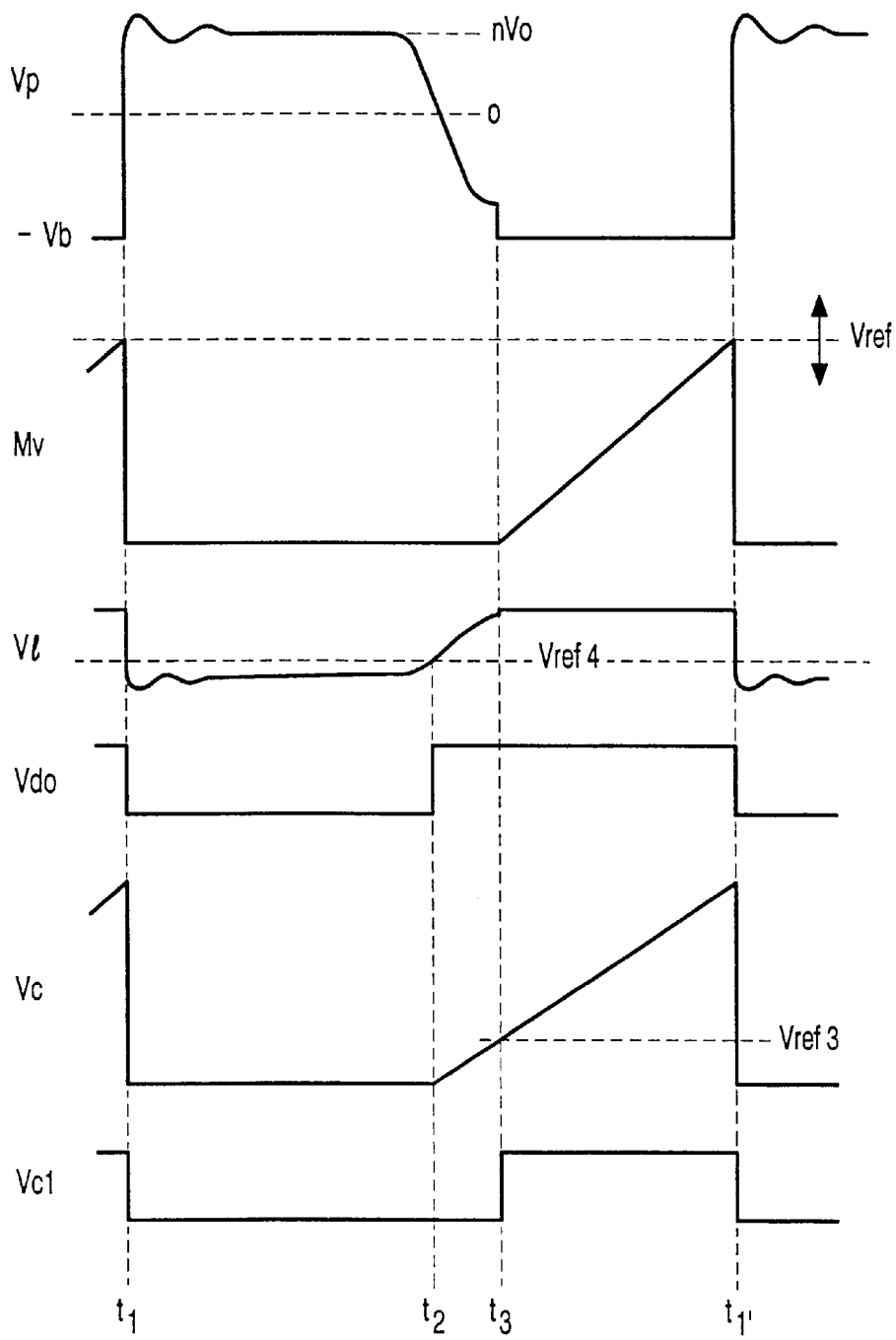

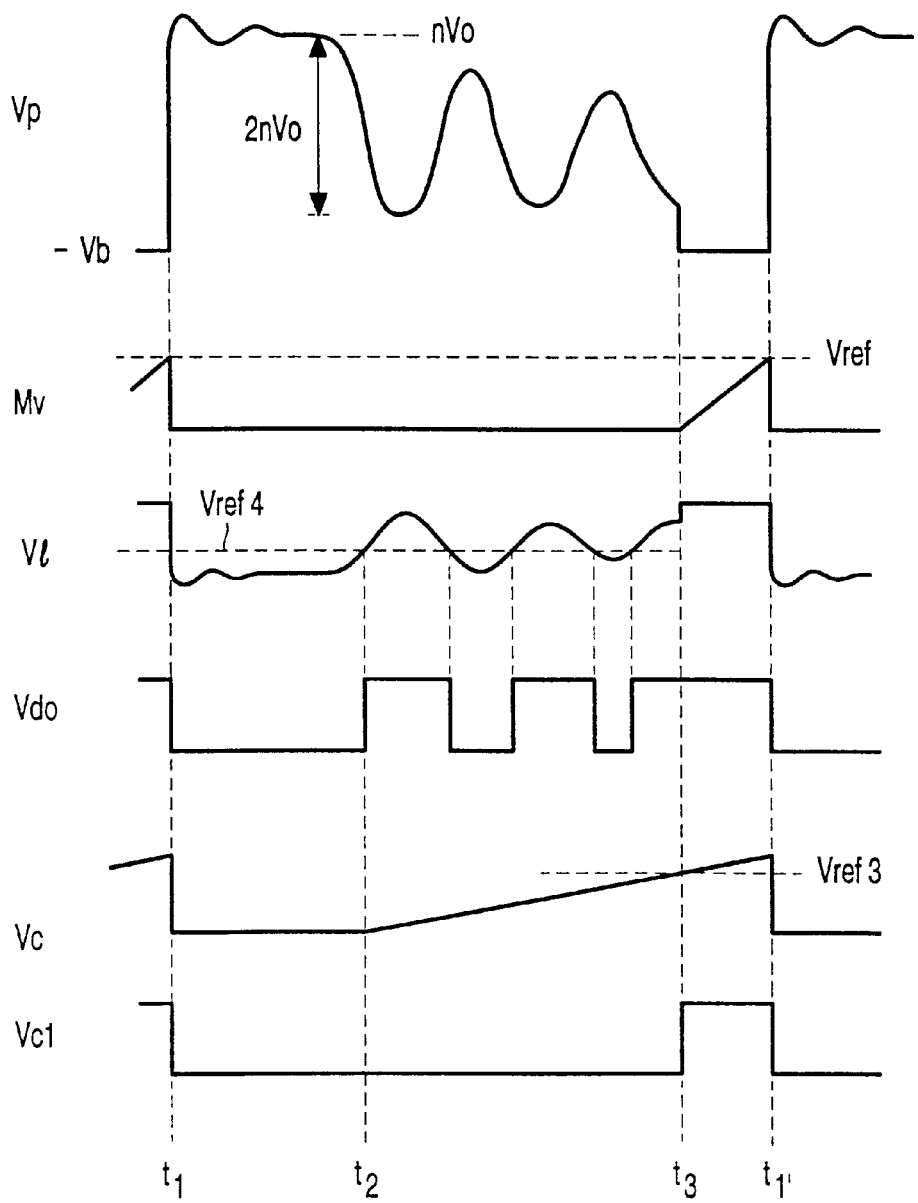

US 6,356,466 B1

MULTIMODE SWITCHED MODE POWER SUPPLY WITH OUTPUT STABILIZATION

BACKGROUND OF THE INVENTION

The invention relates to a multimode switched-mode power supply for operating in a first control mode when the output power supplied is lower than a predetermined value, and in a second control mode when the output power supplied is higher than the predetermined value.

NL-9201428 discloses a dual-mode switched-mode power supply comprising a transformer with a primary and a secondary winding. A series arrangement of the primary winding and a switch receives a mains voltage. Control pulses control the switch to stabilize an output voltage supplied by the secondary winding to a load. In a first control mode, when it is detected that the power supplied is lower than a predetermined value, the control pulses have a first fixed repetition frequency. In a second control mode, when it is detected that the power supplied is higher than a predetermined value, the control pulses have a second fixed repetition frequency which is higher than the first fixed repetition frequency. It is a drawback of the known dual-mode switched-mode power supply that mode transitions result in an undesirable ripple on the output voltage.

SUMMARY OF THE INVENTION

It is, inter alia, an object of the invention to improve the stabilization of the output voltage caused by the mode transitions while maintaining a high efficiency at a low output power.

To this end, a first aspect of the invention provides a multimode switched-mode power supply as claimed in claim 1. A second aspect of the invention provides a control circuit for use in a multimode switched-mode power supply as claimed in claim 5. Advantageous embodiments are defined in the dependent claims.

The multimode switched-mode power supply in accordance with the invention, operates in a first control mode when the output power supplied by the multimode switched-mode power supply (to one load or more loads) is lower than a predetermined value, and in a second control mode when the output power supplied is higher than this predetermined value. In the first control mode, the control circuit may control the frequency of the multimode switched-mode power supply to obtain a substantially constant peak value of the inductor current, independent of the output power supplied. The substantially constant peak value of the inductor current in the first control mode is substantially equal to a peak value of the inductor current at an instant when the second control mode is altered into the first control mode. The instant when the second control mode is altered into the first control mode is determined by the output power decreasing below the predetermined value. As the peak value of the inductor current is substantially constant during transitions between the control modes, the control behavior of the switched-mode power supply is not disturbed and the output voltage will be stabilized very well, even during these transitions. In the prior art, the peak value of the current in the primary winding jumps significantly when the repetition frequency of the control pulses changes during a mode transition (because, during a mode transition, the output power supplied is nearly constant). This peak current jump causes difficulties in the control loop of the switched-mode power supply with respect to stability and transient effects on the output voltage. The control loop will require some time to adapt to the new peak current value, and consequently, the stabilization of the output voltage will not be optimal.

These and other aspects of the invention are apparent from and will be elucidated with reference to the embodiments described hereinafter.

BRIEF DESCRIPTION OF THE DRAWING

In the drawings:

FIGS. 4A to 4L show waveforms elucidating the operation of the embodiment of the multimode switched-mode power supply as shown in FIG. 3.

DESCRIPTION OF THE PREFERRED EMBODIMENTS

Figure 1:
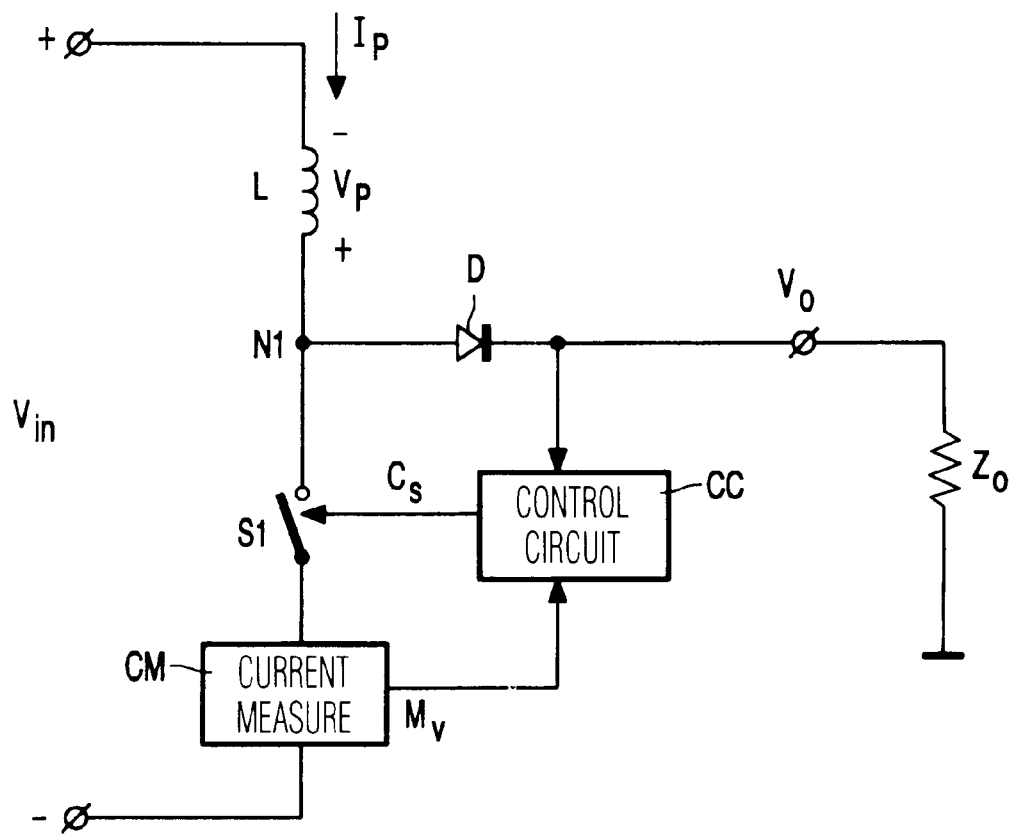
FIG. 1 shows a basic circuit diagram of a multimode switched-mode power supply according to the invention.

FIG. 1 shows a basic circuit diagram of a multimode switched-mode power supply according to the invention. The multimode switched-mode power supply comprises a series arrangement of a switch S1 and an inductor L. The series arrangement is coupled to receive a DC input voltage Vin. A rectifier D is coupled to the inductor L to supply an output voltage Vo to a load Zo. A control circuit CC receives the output voltage Vo to supply a control signal Cs to a control electrode of the switch S1 to control on and/or off times of the switch S1 for stabilizing the output voltage Vo. A current measuring circuit CM measures a value Mv of an inductor current Ip flowing through the inductor L.

The switched-mode power supply operates in a first control mode when the output power supplied to the load Zo is lower than a predetermined value, and in a second control mode when the output power supplied is higher than this predetermined value.

In the second control mode, the switched-mode power supply may operate in a Self Oscillating Mode (further referred to as SOPS mode). The inductor current Ip starts flowing through the inductor L at the instant when the switch S1 is closed. When the inductor current Ip reaches a reference value, the switch S1 is opened, the voltage at the junction N1 of the inductor L and the switch S1 rises, the rectifier D starts conducting and power is supplied to the load Zo. When it is detected that the inductor L is demagnetized (the current in the inductor L is substantially zero), the switch S1 is closed again. The reference value depends on the output power supplied to the load Zo, such that at a high output power, the peak value of the inductor current Ip is larger than at a low output power. This SOPS mode will be elucidated in detail with respect to FIGS. 4A to 4F. The control circuit CC may be configured to obtain a second control mode other than a SOPS mode. For example, a fixed frequency mode may be implemented.

In the first control mode, the control circuit CC controls the peak value of the inductor current Ip in such a way that it is substantially constant, independent of the output power. The substantially constant peak value of the inductor current Ip during the first control mode is substantially equal to a peak value of the inductor current Ip at an instant when the second control mode is altered into the first control mode. In this way, the transition between the two control modes is very smooth as the inductor current Ip is substantially equal just before and just after the transition. The operation of the control circuit CC in the first control mode will be elucidated with respect to FIGS. 4G to 4L. The instant when the second control mode is altered into the first control mode is determined by the output power decreasing below a predetermined value. In an embodiment, this instant is determined by the peak value of the inductor current Ip decreasing below a certain value.

Figure 2:
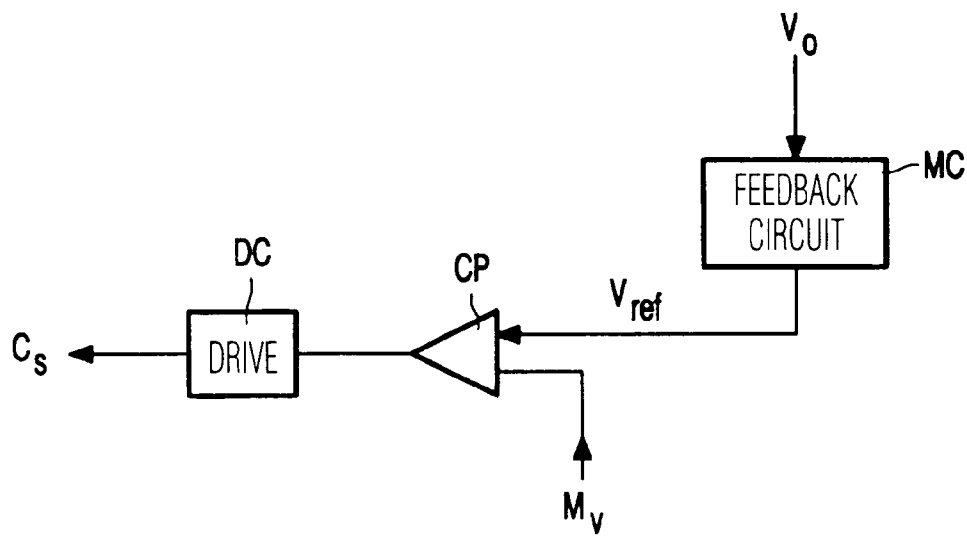
FIG. 2 shows a block diagram of an embodiment of a control circuit for use in the multimode switched-mode power supply according to the invention.

FIG. 2 shows a block diagram of an embodiment of a control circuit for use in the multimode switched-mode power supply according to the invention. Functional blocks and signals indicated by the same references as used in FIG. 1 have the same meaning as elucidated with respect to FIG. 1. The control circuit CC comprises a comparator CP, a feedback circuit MC, and a drive circuit DC. The comparator CP compares the measurement value Mv of the inductor current Ip flowing through the inductor L with a reference value Vref. The feedback circuit MC receives the output voltage Vo to vary, during the second control mode, the reference value Vref in dependence on the output voltage Vo, and to generate a substantially fixed reference value Vref during the first control mode. The fixed reference value Vref is substantially equal to a value of the reference level Vref at the instant when the second control mode is altered into the first control mode. The drive circuit DC supplies the control signal Cs to the control terminal of the switch S1 to switch off the switch S1 when the measurement value Mv crosses the reference value Vref.

Figure 3:
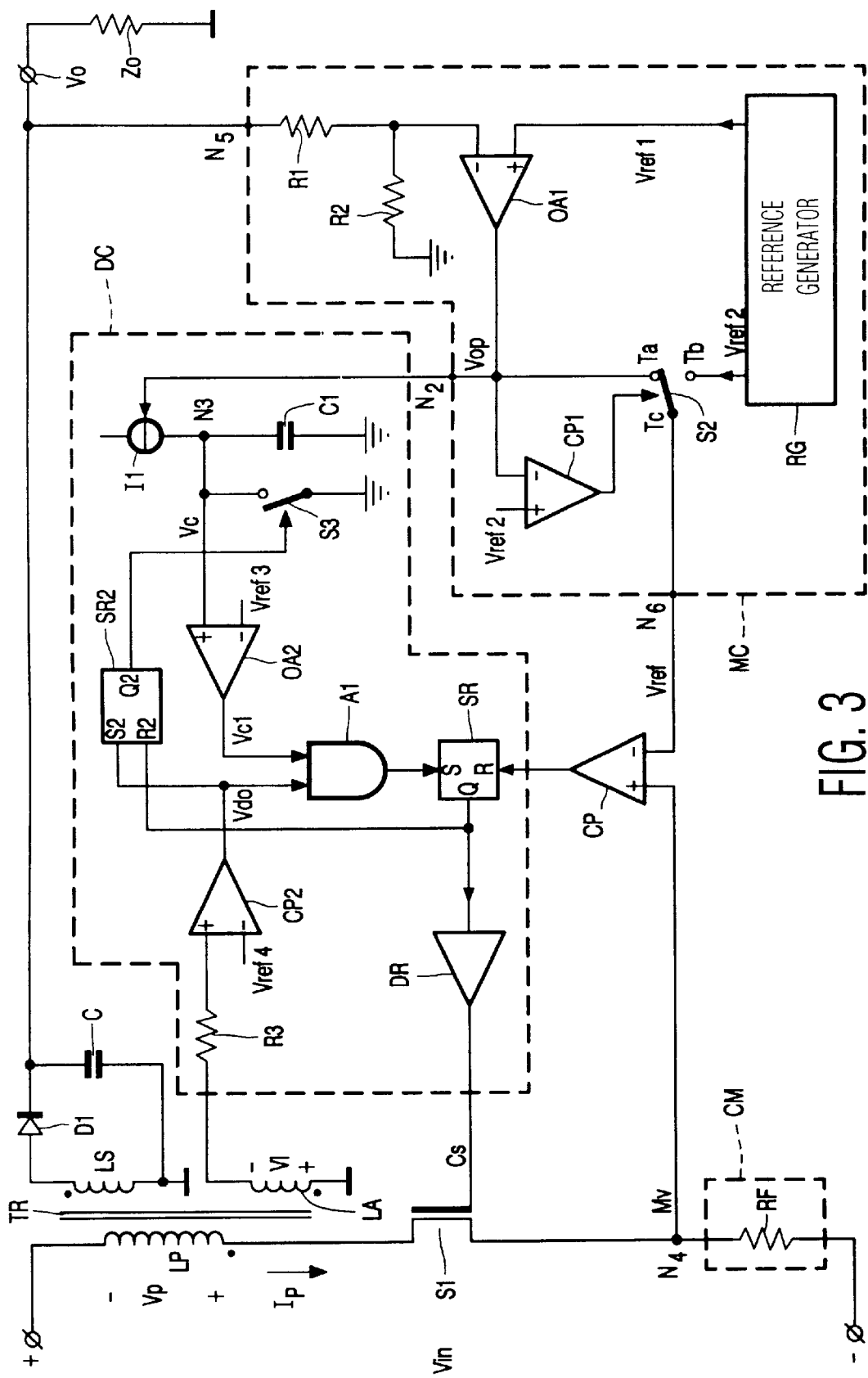
FIG. 3 shows a more detailed circuit diagram of an embodiment of the multimode switched-mode power supply according to the invention.

FIG. 3 shows a more detailed circuit diagram of an embodiment of the multimode switched-mode power supply according to the invention. Functional blocks and signals indicated by the same references as used in FIGS. 1 or 2 have the same meaning as elucidated with respect to FIG. 1 or 2, respectively.

The inductor L is now a transformer TR with a primary winding LP, a secondary winding LS, and an auxiliary winding LA. The primary winding LP is arranged in series with the switch S1 and a resistor RF. The series arrangement receives the DC input voltage Vin. The switch S1 is shown to be a FET, although any suitable controllable electronic switch may be used. The resistor RF forms the current measuring circuit CM. The junction of the switch S1 and the resistor RF is denoted by N4 and carries the measurement value Mv.

A rectifier diode D1 is connected to the secondary winding LS to supply the output voltage Vo. A capacitor C smoothes the output voltage Vo.

The auxiliary winding LA supplies a voltage V1 used to detect whether the transformer TR is demagnetized.

The polarity of the primary winding LP, the secondary winding LS, and the auxiliary winding LA is denoted by a corresponding dot. The diode D1 is poled to obtain a positive output voltage Vo. It should be noted that the polarity of the primary winding LP, the secondary winding LS, the auxiliary winding LA and the diode may be chosen to be different.

The feedback circuit MC comprises an operational amplifier (further referred to as opamp) OA1, a comparator CP1, and a switch S2. The opamp OA1 has an inverting input which receives a feedback voltage Vfb via a voltage divider R1, R2 connected to the output voltage Vo at a node N5, a non-inverting input to receive the reference voltage Vref1, and an output connected to a node N2 to supply a voltage Vop. The voltage Vop varies with the output power supplied by the power supply (in literature, the opamp OA1 is often referred to as error amplifier). The switch S2 has a first terminal Ta connected to the node N2, a second terminal Tb receiving a reference voltage Vref2, and a third terminal Tc supplying the reference voltage Vref at a node N6. The comparator CP1 has an inverting input to receive the voltage Vop, a non-inverting input to receive the reference voltage Vref2, and an output connected to a control terminal of the switch S2. The reference voltage Vref2 is a fraction of the reference voltage Vref1, for example, Vref2=Vref1\4. The switch S2 connects the terminals Ta and Tc when the voltage Vop is higher than the reference voltage Vref2, the switch S2 connects the terminals Tb and Tc when the voltage Vop is lower than the reference voltage Vref2. A reference generator RG generates the reference voltages Vref1 and Vref2.

The drive circuit DC comprises a set-reset flip-flop (further referred to as SRFF) SR with a set input S, a reset input R, and a non-inverting output Q connected to the control terminal of the switch S1 via an amplifier DR. A logic AND A1 has a first input connected to the output of an opamp OA2, a second input connected to an output of a comparator CP2, and an output connected to the set input S of the SRFF SR. The comparator CP2 has a non-inverting input connected to receive the voltage V1 from the auxiliary winding LA via a resistor R3, and an inverting input receiving a reference voltage Vref4. The reference voltage Vref 4 is near zero Volts such that the output voltage Vdo of the comparator CP2 is low as long as the diode D1 conducts and the transformer TR supplies current to the load Zo connected to the output voltage Vo. The transformer TR is demagnetized at the instant when the diode D1 stops conducting. The opamp OA2 has a non-inverting input connected to a node N3 to receive a voltage Vc, and an inverting input receiving a reference voltage Vref 3 to supply at its output the signal Vc1 indicating when the sawtooth voltage across the capacitor C1 crosses the reference level Vref3. A capacitor C1 is connected between the node N3 and ground. A current source I1 is connected to the node N3 to supply a current to the capacitor C1, a value of the current varies in accordance with the voltage Vop at the output of the opamp OA1. A switch S3 is connected in parallel with the capacitor C1, a control terminal of the switch S3 being connected to the output Q2 of a SRFF SR2. The SRFF SR2 has a set input S2 connected to the output of the comparator CP2, and a reset input R2 connected to the output Q of the SRFF SR.

The control circuit CC further comprises the comparator CP which has an inverting input receiving the reference voltage Vref available at the node N6, a non-inverting input receiving the measurement value Mv, and an output connected to the reset input R of the SRFF SR.

The operation of the circuit shown in FIG. 3 will be elucidated with respect to FIGS. 4.

FIGS. 4A to 4L show waveforms elucidating the operation of the embodiment of the multimode switched-mode power supply as shown in FIG. 3. FIGS. 4A to 4F show waveforms when the switched-mode power supply is operating in the second control mode which is a SOPS mode. FIGS. 4G to 4L show waveforms when the switched-mode power supply is operating in the first control mode at a constant peak value of the inductor current.

FIGS. 4A and 4G show the voltage Vp across the primary winding Lp. FIGS. 4B and 4H show the measurement value Mv which represents the current Ip through the primary winding Lp. FIGS. 4C and 4I show the voltage V1 across the auxiliary winding LA. FIGS. 4D and 44J show the voltage Vdo which indicates when the transformer is demagnetized. FIGS. 4E and 4K show the voltage Vc across the capacitor C1. FIGS. 4F and 4L show the voltage Vc1 which indicates when the sawtooth voltage Vc across the capacitor C1 crosses the reference level Vref3.

First, the operation of the switched-mode power supply in the second (SOPS) control mode will be discussed with reference to FIGS. 4A to 4F. As in the second control mode the output power is above a predetermined level determined by Vref2, the comparator CP1 detects that the output voltage Vop of the opamp OA1 is higher than the reference value Vref2. The switch S2 is in the position in which its terminals Ta and Tc are interconnected.

At instant t1, the measurement value Mv which represents the primary current Ip in the primary winding Lp reaches the variable reference level Vref and the comparator CP resets the SRFF SR. The switch S1 opens, the primary voltage Vp starts increasing, and the diode D1 starts conducting. The voltage V1 across the auxiliary winding LA becomes negative, and the output voltage Vdo of the comparator CP2 becomes low. At instant t2, the diode D1 stops conducting, the voltage V1 crosses the reference level Vref4, and the voltage Vdo becomes high, indicating that the transformer TR is demagnetized and that it is allowed to switch on the switch S1 again. Further, at instant t2, the high value of the voltage Vdo causes the switch S3 to open. The sawtooth voltage Vc across the capacitor C1 starts rising. At instant t3, the sawtooth voltage Vc reaches the reference level Vref3, and the output voltage Vc1 of the opamp OA2 becomes high. Now, both the voltages Vc1 and Vdo are high, the SRFF SR is set and the switch S1 is closed. At instant t1', the measurement value Mv again reaches the reference value Vref and the switch S1 opens, the same cycle will be performed as that which started at t1.

The output voltage Vo is stabilized because the reference voltage Vref varies with the output power supplied to the load Zo. The comparator CP compares the actual current Ip through the primary winding Lp with this varying reference voltage Vref to switch off the switch S1 when the primary current Ip crosses a value corresponding to the actual value of the reference voltage Vref. For example, when the output voltage Vout is too high, the reference voltage Vref will decrease, and the switch S1 will be opened at a lower peak value of the primary current Ip. Thus, the peak value of the primary current Ip is controlled in such a way that the output voltage Vo is stabilized.

It is possible to adjust the current I1 in such a way that the switch-on moment of the switch S1 occurs at an instant near the minimal value of the voltage across the switch S1.

Secondly, the operation of the switched-mode power supply in the first control mode is discussed with reference to FIGS. 4G to 4L. As a general remark, the oscillation shown in FIGS. 4G and 4I is due to the resonance of the inductance of the primary winding Lp and the drain source capacitance of the FET S1. As a simplification, this oscillation is not shown in FIG. 4H, the amplitude of the oscillation will be too low to exceed the reference level Vref. As in the first control mode the output power is below the predetermined level determined by Vref2, the comparator CP1 detects that the output voltage Vop of the opamp OA1 is lower than the reference value Vref2 and switch S2 interconnects its terminals Tb and Tc.

At the instant t1, the measurement value Mv which represents the primary current Ip in the primary winding Lp reaches the fixed reference level Vref and the comparator CP resets the SRFF SR. The switch S1 opens and the primary voltage Vp starts increasing. Thus, the switch S1 opens at a fixed peak value of the primary current Ip. Further, the diode D1 starts conducting. The voltage V1 across the auxiliary winding LA becomes negative, and the output voltage Vdo of the comparator CP2 becomes low. At instant t2, the diode D1 stops conducting, the voltage V1 crosses the reference level Vref4, and the voltage Vdo becomes high, indicating that the transformer TR is demagnetized and that it is allowed to switch on the switch S1 again. At instant t2, the high value of the voltage Vdo sets the SRFF SR2 causing the switch S3 to open. The sawtooth voltage Vc across the capacitor C1 starts rising. At the instant t3, the sawtooth voltage Vc reaches the reference level Vref3, and the output voltage Vc1 of the opamp OA2 becomes high. Now, both the voltages Vc1 and Vdo are high, the SRFF SR is set and the switch S1 closes. The set of the SRFF SR resets the SRFF SR2, and the switch S3 is closed. It may also happen that the voltage Vc reaches the reference level Vref3 at an instant when the voltage Vdo is low. Then, the switch S1 will be switched on at the instant when the voltage Vdo becomes high.

The output voltage Vo is stabilized because the current source I1 supplies a current to capacitor C1 which depends on the voltage Vop which is a measure of the output power. It should be noted that the current source I1 supplies less current in the first control mode than in the second control mode (because the output power is lower) and thus the sawtooth voltage Vc is rising less fast. Therefore, it takes longer before the sawtooth voltage reaches the reference level Vref3, and thus the switch S1 will be off during a longer period of time. Further, as the fixed level of the reference voltage Vref in the first control mode is lower than the variable level of the reference level in the second control mode, the switch will be closed for a shorter time. Consequently, due to both these effects, the power supplied to the load Zo will be lower in the first control mode than in the second control mode.

It is possible to replace the controlled current source I1 by a resistor connected between the nodes N2 and N3. Also in this way, the charge current of the capacitor C1 depends on the output power supplied to the load Zo because the voltage Vop at the node N2 varies with the output power.

Figure 5:
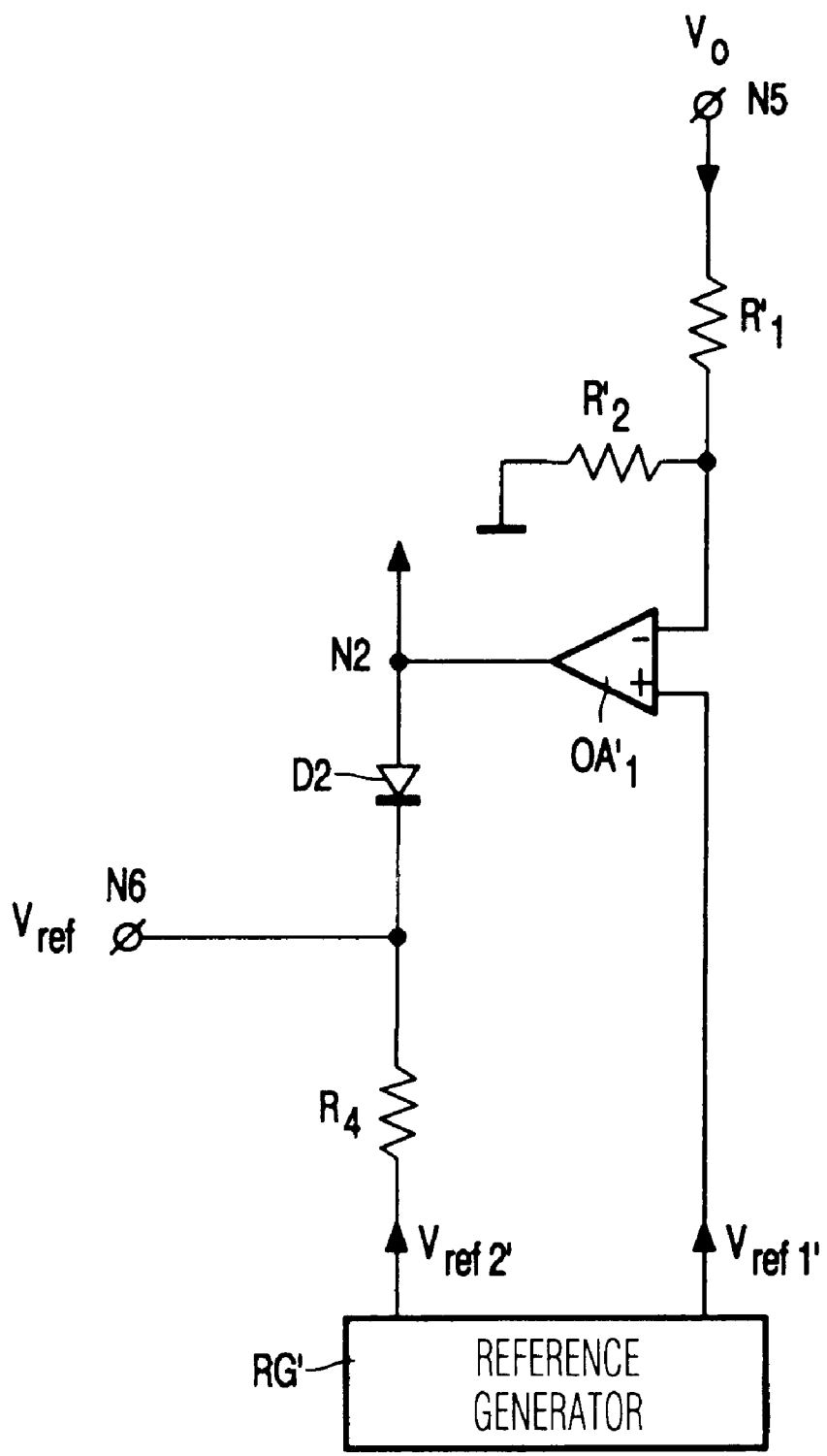
FIG. 5 shows a further embodiment of a feedback circuit for use in the embodiment of the multimode switched-mode power supply as shown in FIG. 3.

FIG. 5 shows a further embodiment of a feedback circuit for use in the embodiment of the multimode switched-mode power supply as shown in FIG. 3. The feedback circuit MC interfaces at the same nodes N2, N5, and N6 as shown in FIG. 3. The feedback circuit MC now comprises an opamp OA1' with an inverting input connected via a voltage divider R1, R2 to the output voltage Vo, a non-inverting input receiving a reference voltage Vref1, and an output connected to the same node N2 as shown in FIG. 3. The feedback circuit further comprises a reference voltage generator RG' to generate the first reference voltage Vref1' and a second reference voltage Vref2' which is a fraction of the first reference voltage Vref1'. A diode D2 has an anode connected to the node N2 and a cathode connected to the node N6 A resistor R4 is connected between node N6 and the reference voltage Vref2'. The reference voltage Vref as shown in FIG. 3 is again supplied at node N6.

This embodiment of the feedback circuit MC operates as follows. At a low output power, thus in the first control mode, the error amplifier OA1' supplies a voltage at the node N2 with such a level that the diode D2 does not conduct. Consequently, the reference value Vref has the fixed value Vref2', and the peak value of the current Ip through the primary winding Lp is constant. At a high output power, thus in the second control mode, the error amplifier OA1' supplies such a voltage at the node N2 that the diode D2 conducts. Consequently, the reference value Vref has a value that varies in accordance with the output power, and the peak value of the primary current Ip will depend on the output power supplied.

Figure 6:
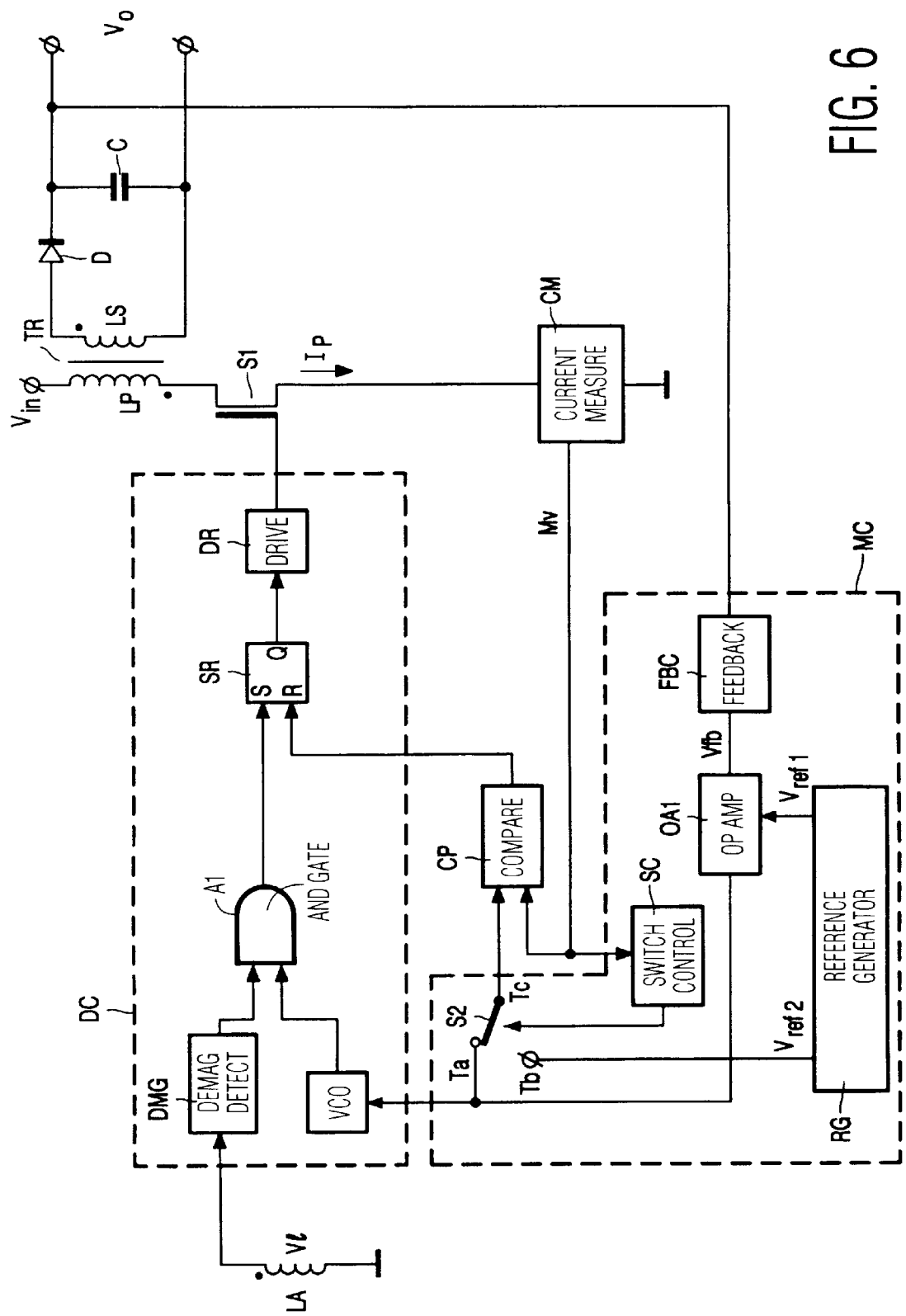
FIG. 6 shows another embodiment of a multimode switched-mode power supply according to the invention.

FIG. 6 shows another embodiment of a multimode switched-mode power supply according to the invention. The same signals and functional blocks as shown in FIG. 3 have the same references.

The transformer TR has the primary winding LP, the secondary winding LS, and the auxiliary winding LA. The series arrangement of the primary winding LP and the switch S1 is coupled to the DC input voltage Vin. The measuring circuit CM is arranged in series with the main current path of the switch S1 to supply the measurement value Mv, representing the primary current Ip through the primary winding LP. The secondary winding LS supplies via the rectifier D1 the output voltage Vo. The capacitor C smoothes the output voltage Vo.

The drive circuit DC comprises a demagnetization detection circuit DMG connected to the auxiliary winding LA to receive the voltage V1 to supply an indication whether the transformer Tr is demagnetized. The demagnetization detection circuit DMG may be configured in the same way as shown in FIG. 3, wherein it comprises the resistor R3 and the comparator CP2. The logic AND A1 has a first input connected to an output of the demagnetization detection circuit DMG, a second input connected to an output of a voltage-controlled oscillator VCO, and an output connected to the set input S of the SRFF SR. The output Q of the SRFF SR is connected to the control electrode of the switch S1 via the driver circuit DR.

The feedback circuit MC comprises a circuit FBC which receives the output voltage Vo to supply the feedback voltage Vfb which represents the value of the output voltage Vo. The circuit FBC may comprise an element such as an optocoupler or a pulse transformer to bridge the voltage difference between the primary and secondary side of the power supply. The opamp or error amplifier OA1 receives the feedback voltage Vfb and the reference voltage Vref1 to supply an error signal representing the output power supplied by the power supply at its output. The switch S2 has a terminal Ta connected to the output of the opamp OA1, a terminal Tb receiving the reference voltage Vref2, and a terminal Tc connected to an inverting input of the comparator CP. A switch control circuit SC receives the measurement value Mv to control the switch S2 to interconnect the terminals Ta and Tc when the output power (and thus the peak value of the primary current) is higher than a predetermined value, and to interconnect the terminals Tb and Tc when the output power is lower than the predetermined value determined by Vref2. The comparator CP has a further input receiving the measurement value Mv, and an output connected to the reset input of the SRFF SR. The output frequency of the voltage-controlled oscillator VCO is controlled by the error signal supplied by the opamp OA1. The reference generator RG generates the reference voltages Vref1 and Vref2.

Consequently, similarly as in the circuit shown in FIG. 3, the comparator CP has an inverting input which is connected via the switch S2 to (i) a fixed reference voltage Vref2 when the switched-mode power supply is in the first control mode, and to (ii) the output of the error amplifier OA1 when the switched-mode power supply is in the second control mode.

The reset of the SRFF SR functions in the same way as is explained with respect to the switched-mode power supply shown in FIG. 3. The main difference with respect to the circuit shown in FIG. 3 is that, now, error amplifier OA1 controls the set instant of the SRFF SR when the switch S1 is closed by controlling the frequency of the voltage controlled-oscillator VCO.

It should be noted that the above-mentioned embodiments illustrate rather than limit the invention, and that those skilled in the art will be able to design many alternative embodiments without departing from the scope of the appended claims. For example, the current Ip in the primary winding may also be measured with a transformer, while it is also possible to measure the voltage across the switch S1 when this switch has a substantially constant impedance when closed, which is, for example, the case when the switch S1 is a field-effect transistor. The multimode switched-mode power supply may have further control modes than the mentioned two modes, for example, for an extremely low or high output power. In the claims, any reference signs placed between parentheses shall not be construed as limiting the claim. The word "comprising" and its conjugations does not exclude the presence of elements or steps other than those listed in a claim. The invention can be implemented by means of hardware comprising several distinct elements, and by means of a suitably programmed computer. In the device claim enumerating several means, several of these means can be embodied by one and the same item of hardware.

What is claimed is:

1. A multimode switched-mode power supply for operating in a first control mode when an output power supplied by said power supply is lower than a predetermined value, and in a second control mode when said output power is higher than said predetermined value, said power supply comprising:

a series arrangement of a switch (S1) and an inductor (L; Lp), the series arrangement being coupled to receive a DC input voltage (Vin), and a control circuit (CC) for periodically controlling on and/or off times of the switch (S1) to generate an inductor current (Ip) in the inductor (L; Lp), characterized in that the control circuit (CC) further comprises means (CP, MC) for controlling, in the first control mode, a peak value of said inductor current (Ip) to be substantially constant, independent of the output power supplied, which substantially constant peak value is substantially equal to a peak value of said inductor current (Ip) at an instant when the second control mode is altered into the first control mode.

2. A multimode switched-mode power supply as claimed in claim 1, characterized in that the multimode switched-mode power supply further comprises a rectifier (D; D1) coupled to the inductor (L; Lp) for generating a DC output voltage (Vo), the control circuit (CC) comprises a current measuring means (CM) for measuring a value (Mv) of the inductor current (Ip), and in that the means for controlling (CP, MC) comprise:

a comparator (CP) for comparing said measurement value (Mv) with a reference value (Vref), and means (MC) for receiving said output voltage (Vo) to vary, during the second control mode, the reference value (Vref) in dependence on the output voltage (Vo), and to generate a substantially fixed reference value (Vref) during the first control mode, which fixed reference value (Vref) is substantially equal to a value of the reference level (Vref) at the instant when the second control mode is altered into the first control mode, the control circuit (CC) further comprises means (DC) for supplying a control signal (Cs) to a control terminal of the switch (S1) to switch off the switch (S1) when the measurement value (Mv) crosses the reference value (Vref).

3. A multimode switched-mode power supply as claimed in claim 2, characterized in that the means (DC) for supplying a control signal (Cs) comprise a set-reset flip flop (SR) with a reset input (R) coupled to an output of the comparator (CP), and a non-inverting output (Q) coupled to the control terminal of the switch (S1).

4. A multimode switched-mode power supply as claimed in claim 1, characterized in that said inductor (L) is a transformer (TR) comprising a primary winding (LP) and a secondary winding (LS), said inductor current (Ip) flowing through the inductance (L) being a primary current (Ip) flowing through the primary winding (LP).

5. A control circuit (CC) for use in a multimode switched-mode power supply operating in a first control mode when the output power supplied by said power supply is lower than a predetermined value, and in a second control mode when said output power is higher than said predetermined value, said power supply comprising: a series arrangement of a switch (S1) and an inductor (L; Lp), the series arrangement being coupled to receive a DC input voltage (Vin), and a rectifier (D; D1) coupled to the inductor (L; Lp) for supplying an output voltage (Vo), the control circuit (CC) being adapted to periodically control on and/or off times of the switch (S1) to generate an inductor current (Ip) in the inductor (L; Lp), characterized in that the control circuit (CC) comprises means (CP, MC) for controlling, in the first control mode, a peak value of said inductor current (Ip) to be substantially constant, independent on the output power supplied, which substantially constant peak value is substantially equal to a peak value of said inductor current (Ip) at an instant when the second control mode is altered into the first control mode.

6. A control circuit (CC) as claimed in claim 5, characterized in that the means (CP, MC) for controlling comprise:

a comparator (CP) for comparing a measurement value (Mv) representing the inductor current (Ip) with a reference value (Vref), means (MC) for receiving said output voltage (Vo) to vary, during the second control mode, the reference value (Vref) in dependence on the output voltage (Vo), and to generate a substantially fixed reference value (Vref) during the first control mode, which fixed reference value (Vref) is substantially equal to a value of the reference level (Vref) at the instant when the second control mode is altered into the first control mode, and means (DC) for supplying a control signal (Cs) to a control terminal of the switch (S1) for switching off the switch (S1) when the measurement value (Mv) crosses the reference value (Vref).

* * * * *